United States Patent [19]

Ogawa et al.

[11] Patent Number: 5,411,790

[45] Date of Patent: * May 2, 1995

[54] SIGNAL INPUT SHEET

[75] Inventors: Kiichiro Ogawa, Saitama; Hiroshi Yamada; Youzou Nouno, both of Koganei; Yasuo Kagami, Tokyo, all of Japan

[73] Assignee: Toppan Moore Co., Ltd., Chiyoda, Japan

[ * ] Notice: The portion of the term of this patent subsequent to Jan. 13, 2004 has been disclaimed.

[21] Appl. No.: 23,356

[22] Filed: Feb. 26, 1993

[30] Foreign Application Priority Data

Feb. 29, 1992 [JP] Japan .................. 4-078141

[51] Int. Cl.$^6$ ............................. B32B 9/00
[52] U.S. Cl. ..................... 428/209; 178/18; 178/19
[58] Field of Search .............. 178/18, 19; 428/209

[56] References Cited

U.S. PATENT DOCUMENTS 4,636,582 1/1987 Moriwaki et al. ............. 178/18

*Primary Examiner*—Patrick J. Ryan
*Assistant Examiner*—Kam F. Lee
*Attorney, Agent, or Firm*—Weingarten, Schurgin, Gagnebin & Hayes

[57] ABSTRACT

A signal input sheet having a cover film made of a soft material at its surface, its repetitive writing durability is improved to obtain a signal input sheet having a good feeling and writing condition, and a high durability. A hard film layer 18 harder than a sheet 10 and cover film 15 is set between the sheet 10 made of a soft material and the cover film 15 located at the upper side and slightly harder than the sheet.

3 Claims, 4 Drawing Sheets

SIGNAL INPUT SHEET

BACKGROUND OF THE INVENTION

1. Field of the Invention

The present invention relates to a signal input sheet used to input a signal at a desired position on the surface of a sheet in response to the pressure of the position.

2. Background Art

Various on-line real-time character recognition devices have been known which recognize information while describing the information to input handwritten information (see the official gazelle of Japanese Patent Laid-Open No. 56-124973). As handwritten input devices used for these devices, various sheet-like input devices have been known which utilize the distortion of the surface of a sheet due to the writing pressure when information is described on the surface of the sheet to obtain a position signal according to the variation of writing order.

These sheet-like input devices are designed so that a conductive surface is positioned in an isolated state on a basic resistance surface which is a detecting base plate, and the conductive surface contacts the base resistance surface according to a writing pressure to form a variable electric circuit to sequentially obtain position signals. The isolated structure of the conductive surface for the basic resistance Surface includes a pressure sensitive conductive rubber in which a conductive material is discontinuously distributed in the rubber so that the conductive material continuously keeps conductivity when a writing pressure is applied and a mesh sheet in which a sheet is with holes like meshes is set between the basic resistance surface and the conductive surface so that the conductive surface contacts the basic resistance surface to obtain conductivity through the meshes when a writing pressure is applied (see the official gazette of Japanese Patent Publication No. 59-7992).

This applicant proposes a signal input sheet to be put on a base with a basic resistance surface at its surface and having a conductive layer at the bottom facing the basic resistance surface as disclosed in the official gazette of Japanese Patent Publication No. 3-48529. As shown in FIG. 2, the signal input sheet 1 is put on a base made by forming a conductive paste layer "b" on the surface of an etching substrate "a" (the surface of the layer "b" serves as a basic resistance surface 4 to be mentioned later), in which a conductive layer 11 is formed at the back face of a sheet 10 made of a soft material and a predetermined surface of the layer is divided into an electrical point contact surface (symbol 111 to be mentioned later) and a non-contact section and an insulating material made of insulating ink 12 containing a material contacting with the conductive layer 11 is formed on the conductive layer 11 of the non-contact section.

Moreover, the applicant proposes a signal input sheet having a conductive shield layer so that the static electricity of a human body will not affect devices as disclosed in the official gazette of Japanese Patent Laid-Open No. 61-43332. As shown in FIG. 2, the signal input sheet 1 has a structure in which a cover film 15 made of a soft material, an adhesive layer (non-adhesive paste) 131, and a shield layer 13 are laminated on the sheet 10 in order from the top.

The existing signal input sheet, as described above, has a cover film made of a soft material such as a urethane film on its surface to improve the feeling and writing condition of the surface. However, because the cover film slightly harder than the sheet is put on the soft sheet, there is a problem that the sheet is inferior in its durability under the state in which local deformation of the signal input sheet is repeated due to repetition of writing.

Some signal input sheets use a hard surface film made of a hard material such as a PET film (polyethylene terephthalate film) or hard surface material made of a glass thin plate for their surface. In this case, however, the input feeling is bad, a writing utensil may slip, and the feeling and writing condition are not good. Moreover, though these sheets withstand a writing pressure equal to or lower than the set load, permanent deformation is left when a writing pressure larger than the set load is applied and the feeling and writing condition are greatly impaired. Those using the glass thin plate may be cracked. Therefore, a dedicated writing utensil (designed so that the writing pressure does not exceed a certain value) is normally attached to these signal input sheets. However, the dedicated writing utensil is restricted in the writing condition or the like. Therefore, it is impossible to cover every condition.

SUMMARY OF THE INVENTION

Therefore, it is a subject Of the present invention to improve the durability of a signal input sheet using a cover film made of a soft material for the surface in repetitive writing and it is an object of the present invention to provide a signal input sheet having a good feeling and writing condition and a large durability.

Because the present invention has a sandwich structure formed by setting a hard film layer which is made of a hard material and harder than the cover film and sheet which are made of a soft material between the cover film and the sheet, the hardness of the entire sheet is increased while the good feeling and writing condition are kept and the load of the sheet is decreased during writing.

DETAILED DESCRIPTION OF THE PREFERRED EMBODIMENTS

Description of handwritten form input device using signal input sheet

First, a handwritten form input device using the signal input sheet of the present invention is described below (see Japanese Patent Laid-Open No. 61-43332).

Figure 4:
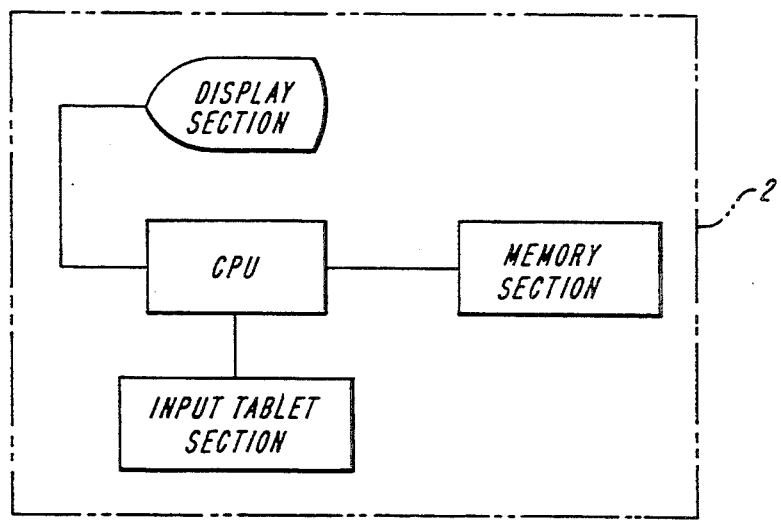
FIG. 4 is an illustration of the structure of a handwritten form input device according to the invention.
Figure 3:
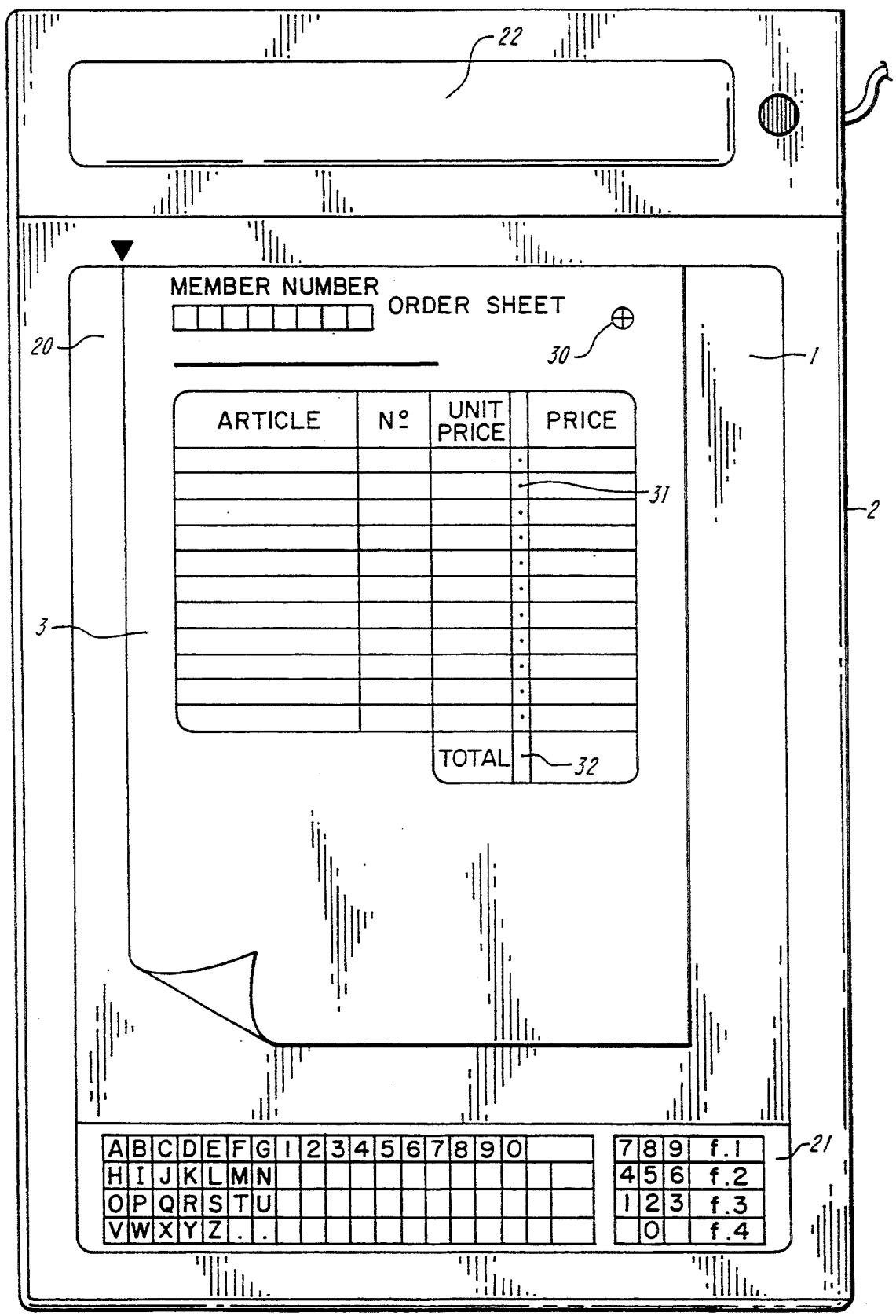
FIG. 3 is an illustration of a handwritten form input device using the signal input sheet of the present invention.
Figure 5:
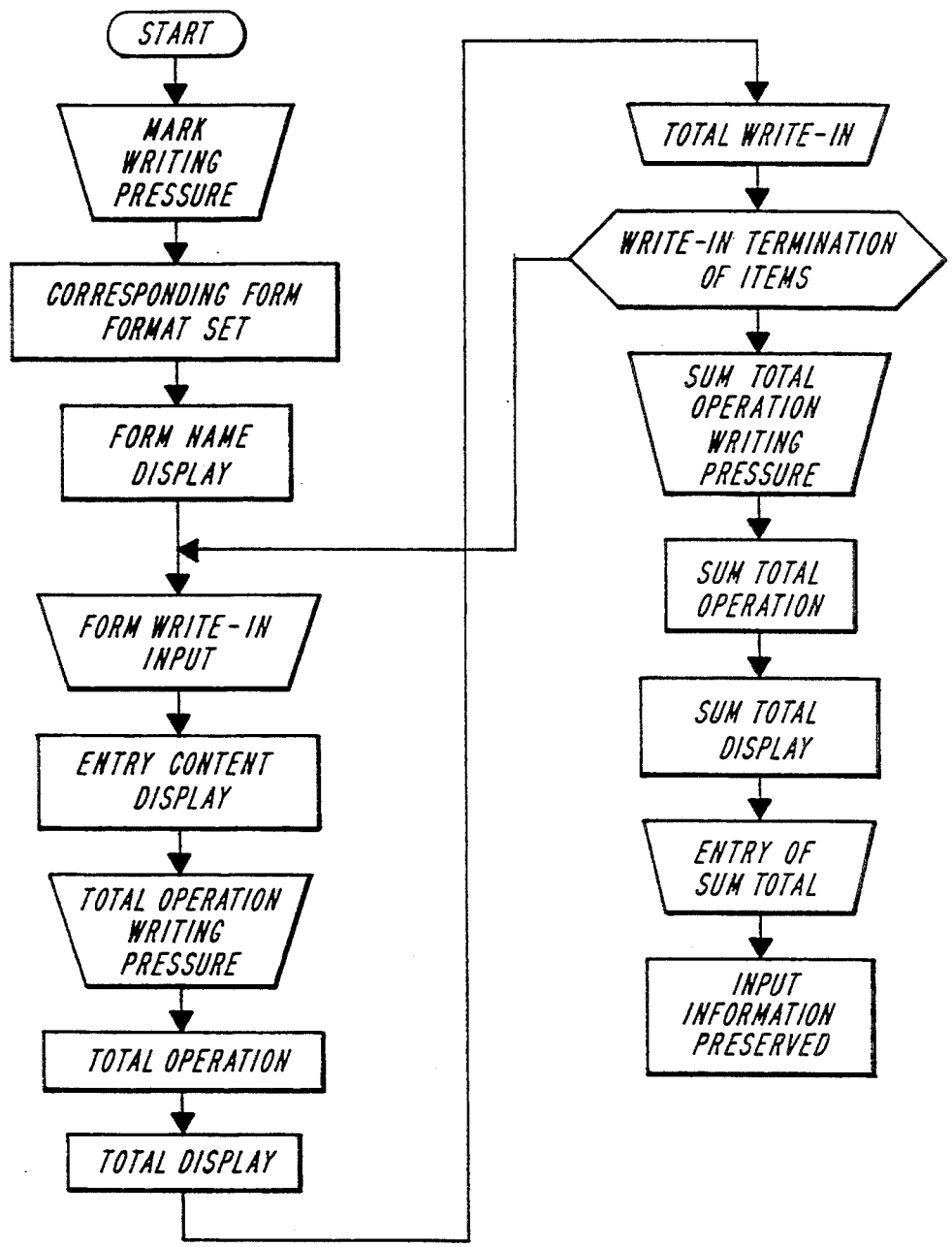
FIG. 5 is a flow chart of the processing procedure of a handwritten form input device according to the invention.

The following is the description of the state in which the signal input sheet is used in FIGS. 3 to 5.

FIG. 3 shows a handwritten form input device 2 having the signal input sheet 1 of the present invention. A form setting area 20 to set the signal input sheet 1 on it is formed on the surface of the handwritten form input device 2. A form 3 is placed on the form setting area 20 to handwrite data in the form and input a signal simultaneously. A key pattern display section 21 is formed adjacently to the form setting area 20 on the signal input sheet 1. Characters, numerals, and symbols are separately displayed on the key pattern display section 21 so that the corresponding key entry can be additionally performed by applying a writing pressure to a desired character, numeral, or symbol. Moreover, a liquid-crystal display section 22 is formed on the handwritten form input device 2, in which an input signal is displayed or an operation result or input instruction is displayed so that the input, operation, or processing procedure can be confirmed.

The handwritten form input device allows various forms with different purposes or different layouts to be inputted. The form 3 to be processed of different sizes is secured with its upper hem or upper and lateral hems. When the form 3 is set to the form setting area 20 and a writing pressure is applied to a form-type designation mark 30 indicates at a position different for each type of form, a form format corresponding to the form 3 is selected in a memory storing a plurality of form formats and set to the input tablet section of the form setting area 20, the information and operations inputted to the form 3 according to the form format are processed by a CPU, and entries and operation results are displayed on the display section 22 as Shown in FIG. 4. For example, the processing procedure according to the flow chart shown in FIG. 5 is described below by using the form (order slip) placed on the signal input sheet 1 of the handwritten form input device 2. When the form 3 is set to a predetermined position and then, a writing pressure (mark writing pressure) is applied to the form-type designation mark 30, a form format corresponding to the form 3 is set to the input tablet section or the signal input sheet 1 according to a position signal on the form setting area 20 (corresponding form format set).

Then, a form name is displayed on the display section 22 (form name display) and it is checked if the name is the same as that of the set form before starting writing of data in the form (form write-in input). When entering a user's name and member's number before entering an article name, quantity, and unit price specified in the order slip, each entry is displayed on the display section 22 (entry content display). Therefore, data can be entered while confirming it, and by applying a writing pressure to a total entry mark 31 (total operation writing pressure), a total is computed (total operation) and displayed on the display section 22 (total display). Thus, the total can be written according to the display (total write-in). After writing data up to a predetermined item (write-in termination of items), a sum total is also displayed by applying a writing pressure to a sum total entry mark 32 (sum total operation writing pressure). By similarly writing the sum total, data can be easily written in the form (sum total operation)(sum total display)(sum total entry)(input information preserved).

For the handwritten form input device 2, a form format is selected by securing the form 3 to be process to a predetermined position and inputting a position signal generated due to a writing pressure applied to a form-type designation mark 30 to the signal input sheet 1. However, a structure is permitted in which the form 3 is set to a desired position on the signal input sheet 1 and at least two form position designation marks are indicated on the form 3 so that it is possible to Judge in which direction and how the form 3 is set by the form position designation marks. In this case, it is also permitted that a form format judged as a form type signal is selected at the interval between two form position designation marks.

[Outline of signal input sheet]

The signal input sheet I comprises a sheet 10 made of an insulating polyurethane film having flexibility and a conductive layer 11 formed by applying conductive ink to a predetermined area of the back of the sheet 10, in which the predetermined area of the conductive layer 11 is formed into an electrical contact surface 110 and other area is formed into an electrical point contact surface 111 and a plurality of dot-like insulating materials 12 made of insulating ink are formed on the electrical point contact surface 111 to form the portion of the insulating materials 12 into a non-contact section and other portion into a contact section.

Concerning Sheet 10

For the above embodiment, the sheet 10 uses insulating polyurethane. However, it is not restricted to the insulating polyurethane. It is also possible to select a sheet having a proper tensile strength, elongation, elasticity, and flexibility according to a purpose including the writing pressure applying method and input signal continuity by considering the writing fitness, various durabilities of the tip of a writing utensil, and profitability. As the material of tile sheet 10, it is possible to use a film made of polyethylene, EVA (ethylene-vinyl acetate copolymer), ionomer, polypropylene, cellulose acetate, cellulose acetate butyrate, cellulose propionate, ethyl cellulose, polyvinyl chloride, vinyl chloride-vinyl acetate copolymer, polyvinylidene chloride, polyvinyl alcohol, polymethyl methacrylate, polyamide, polycarbonate, polyester, fluorocarbon resin, rubber hydrochloride, polyimide, or polysulfone. In this case, because the film thickness is also an important factor, it is necessary to select a proper film thickness together with the conductive layer thickness and insulating material height. To extract a writing-pressure position signal, it is necessary to select a film with the thickness of 0.01 to 1 mm.

Insulating material 12 (See Japanese Patent Laid-Open No. 60-51928.)

To select the insulating material 12 using insulating ink, it is necessary to select insulating ink having a good contacting characteristic with at least the conductive layer 11. This is because a pressure such as a writing pressure forcibly expands the insulating material 12, that is, it causes the material 12 to exfoliate, and if the portion exfoliates, the electrical point contact surface 111 contacts the basic resistance surface 4 (the input device body side) under the normal overlapped slate, and resultingly the material 12 does not serve as a signal input sheet. To prevent this, it is necessary to use the material same as that used for the conductive ink for forming the conductive layer 11. In this case, it is necessary to set the volume resistivity of the insulating ink to $10^5 \Omega$ cm or more, more preferably to $10^9 \Omega$ cm or more. The printing method of the insulating material 12 is not restricted similarly to the printing of the conductive layer 11. For the shape of the insulating material 12, however, it is necessary to decide the size, height, density, and arrangement according to the material, thickness, tear strength, elongation, elasticity, and flexibility of the sheet 10, and the input signal waveform and the state of the basic resistance surface 4. To convert a writing pressure into a signal, it is necessary to decade the dot diameter, height, and density (occupying degree of unit area) at the following range.

Dot diameter: 0.002 to 1.0 mm
Height : 0.01 to 0.2 mm
Density(occupancy of unit area) : 5 to 95%

Figure 8:
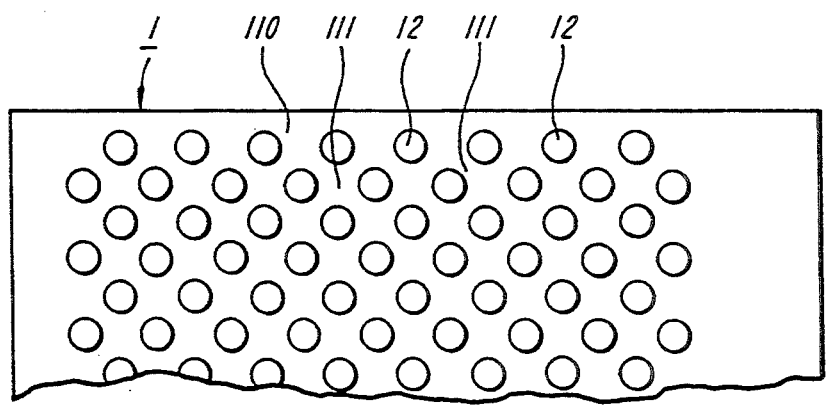
FIG. 8 is an illustration of an insulating material arrangement pattern.

FIG. 8 shows one of the arrangement patterns (the electrical point contact surface 111 side) of the insulating material 12. The insulating material 12 uses the insulating ink mainly containing titanium oxide and polyurethane resin selected among minerals or pigments as ink reducer material, flow prevention material, and height holding material. Moreover, it is possible form dots with the average diameter of 0.1 mm, interval of 0.10 mm, and height of 0.06 mm according to the pattern shown in FIG. 8 through the screen printing method by using a screen having holes with the average diameter of 0.05 mm and the average interval of 0.20 mm between a hole and diagonally next hole, applying ink at the average height of 0.08 mm. The portion of the insulating material 12 serves as a non-contact section and other portion serves as a point contact section.

Moreover, because the conductive layer (11) and resistance layer (basic resistance surface 4) are arranged vertically separately from each other, the structure made by attaching the insulating material 12 using insulating ink to the conductive layer 11 arranged at the upper side is superior in the writing fitness and allows stable entry because the insulating material 12 is secured at the back of the writing surface. Furthermore, the insulating material 12 is hardly exfoliated from the conductive layer. Thus, the structure has a large durability.

Concerning Shield Layer 13

Figure 6:
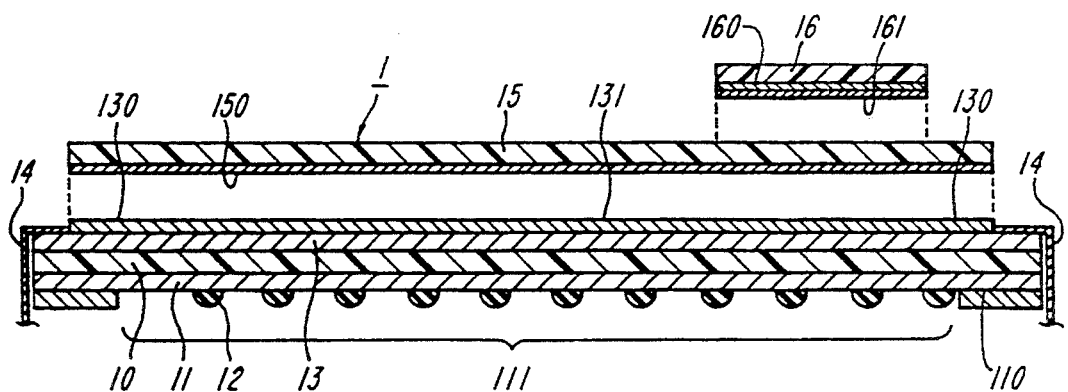
FIG. 6 is an illustration of the basic structure of a signal input sheet according to the invention.

A shield layer 13 made coated with conductive ink is homogeneously formed on the entire surface of the sheet 10 and an earth 14 is connected to the shield layer 13 from a plurality of positions on the margin. Moreover, a cover film 15 is attached to the surface of the shield layer 13 through the pressure sensitive adhesive double coated tape 130 set on the surface margin of the shield layer 13 and the non-adhesive paste 131 applied to the surface of the shield layer 13. The back of the cover film 15 is provided with single-color or multiple-color appearance prints 150 including the printing area prints such as an entry example, operation example, pictorial diagram, symbol, or description and the solid prints. Moreover, in FIG. 6, symbol 16 is a key film which is attached onto the cover film 15 by corresponding to a predetermined position on the detection surface of a handwritten information input device or a sheet-like input device and the back of the film is provided with a appearance print 160 of a key pattern and coated with non-adhesive paste 161.

As the conductive material of the conductive layer 13 and shield layer 13, it is possible to use powder of gold, silver, nickel, or carbon in view of the use and profitability. To make the powder into conductive ink, it is necessary to select the same malarial as the sheet 10 such as acrylic, epoxy, phenol, polyester, urethane, or silicon by considering the adhesiveness with the above-mentioned sheet material (sheet 10). The applying method is not restricted to the silk screen printing method but it is also possible to use the single or multiple printing method for lithography, intaglio printing, and letterpress printing, spray method, or other method. In this case, it is necessary to decide the thickness of the conductive layer 11 by considering the type, shape, and required conductivity of the above conductive material. However, the thickness of at least approx. 0.002 mm is necessary. Even for a thicker film, flexibility is necessary. A film with the thickness of 0.05 mm can be used. Normally, it is possible to use a film with the thickness of 0.005 to 0.02 mm.

For this embodiment, the conductive layer (11) and the resistance layer (basic resistance surface 4) are arranged vertically separately from each other and the shield layer 13 is formed on the surface of the upper layer (conductive layer or resistance layer) through an insulating layer. Besides the above embodiment, when the conductive layer is formed into a sheet by pressure-sensitive conductive rubber, it is necessary to form at least an insulating layer on the surface of the conductive layer such as the pressure-sensitive conductive rubber. It is also possible to make the conductive shield layer 13 to serve as a cover instead of attaching the cover film 15 onto the shield layer 13.

Description for Writing in Handwritten Form Input Device

Figure 7:
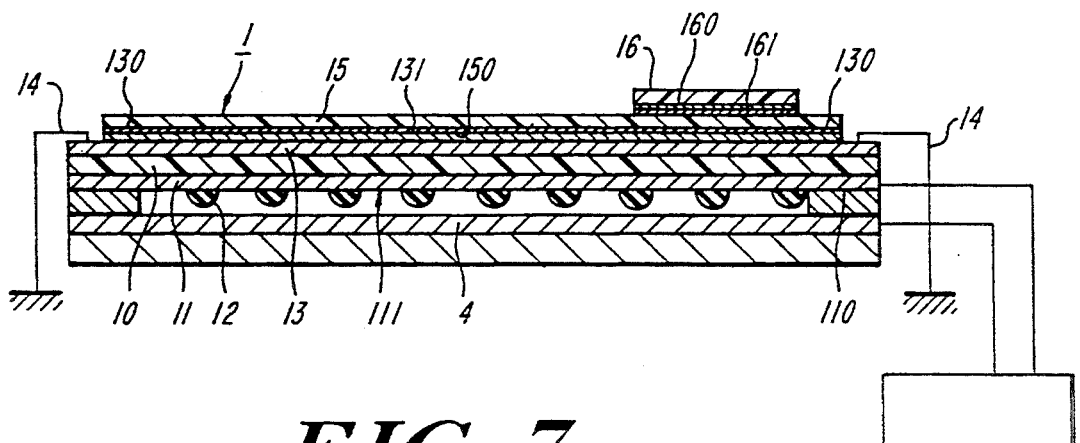
FIG. 7 is an illustration of a signal input sheet and basic resistance surface according to the invention.

FIG. 7 shows the state in which the signal input sheet 1 is placed on the basic resistance surface 4 at the input tablet section of the handwritten form input device 2. Under the normal state, the insulating material 12 is set between the conductive layer 11 and basic resistance surface 4, the conductive layer 11 is separate from the basic resistance surface 4, the whole electrical point contact surface 111 does not contact the basic resistance surface 4, and the electric circuit comprising the contact surface 110 and basic resistance surface 4 opens when a voltage is applied to the electrical contact surface 110 and basic resistance surface 4.

However, when applying a writing pressure to a desired portion during use with a writing utensil, the cover film 15 and sheet 10 dent and thereby the conductive layer 11 dents to contact with the basic resistance surface 4, the electrical point contact surface 111 and the basic resistance surface 4 are brought under the point contact state, and the electric circuit comprising the electrical contact surface 110 and the basic resistance surface 4 closes when a voltage is applied to the surfaces 110 and 4.

For information entry, static electricity electrified in a human body flows from the shield layer 13 to the earth 14 through the cover film 15 without affecting the conductive layer 11 and basic resistance surface 4 because the shield layer 13 electrostatically shields the conductive layer 11 and basic resistance surface 4 from an external electrostatic field.

The above earth is not restricted in the connecting portion and the quantity on the margin of the shield layer. If an arrangement using AC as the power source (e.g. a fluorescent lamp) is present in the vicinity of the handwritten information input device, the handwritten information input device picks up the noises generated by the fluorescent lamp. However, this problem is solved by setting a filter (integrator comprising a capacitor and resistance) to the device.

Description of Signal Input Sheet of the Present Invention

Figure 1:
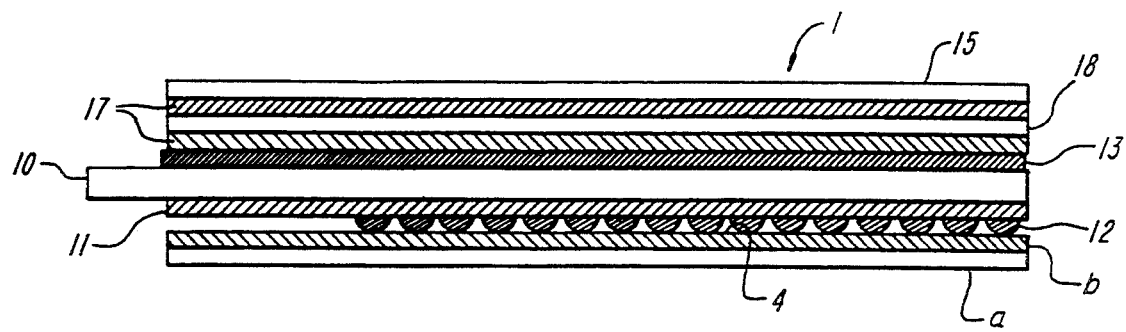
FIG. 1 is a sectional view of an embodiment of the signal input sheet of the present invention.
Figure 2:
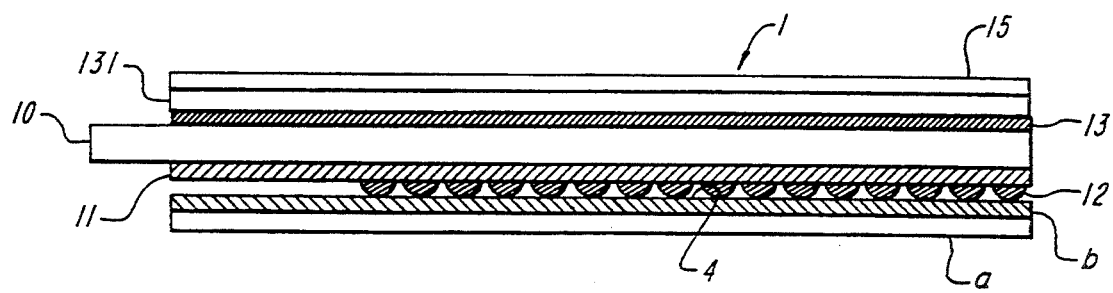
FIG. 2 is a schematic view of a signal input sheet of the invention having an insulating material and shield layer.

The present invention is described below in detail according to an embodiment shown in FIG. 1, However, portions basically same as those of the handwritten form input device shown in FIGS. 2 to 8 are provided with the Same symbols and their description is omitted. FIG. 1 does not show auxiliary structural portions such as the appearance print shown in FIGS. 6 and 7 but it schematically shows the structure of the present invention.

That is, in the present invention, the surface structure of the signal input sheet 1 is formed by laminating the cover film (slightly harder than the sheet layer) 15 made of a soft material, adhesive layer 17, hard film layer 18 made of a hard material (e.g. PET film) harder than the sheet 10 and cover film 15, adhesive layer 17, and shield layer 13 in order from the top on the sheet 10 made of a soft material. Thereby, the surface of the signal input sheet 1 has a specific feeling given by the cover film 15, no large load is applied to the sheet 10 because the entire stiffness is improved, and the durability is improved.

For the cover film of the signal input sheet, the thickness of 50 to 500 $\mu$m is preferable and especially, the thickness of 100 to 200 $\mu$m is optimum. For the sheet, the thickness of 100 $\mu$m to 1 mm is preferable and especially, the thickness of 400 to 600 $\mu$m is optimum. For the hard film layer, the thickness of 10 to 100 $\mu$m is preferable and especially, the thickness of 25 to 75 $\mu$m is optimum. A hard film layer having the following hardness is listed as one of the optimum layers.

1) Pencil hardness—H
2) Sand dropping method (Haze (%))
   #80 grit 1000 g—75
   #80 grit 2000 g—85
3) Taper abrasion (Haze (%))—50
   (CS-10F abrasion ring, 500g×2, 100 cycle)

The above embodiment shows a signal input sheet whose bottom is a conductive layer. However, the present invention is not restricted to the embodiment. It is also possible to use the bottom of the signal input sheet as a resistance layer.

The present invention described above provides a signal input sheet with a improved stiffness and a good writing durability compared with a sheet having a cover film made of an existing soft material because the load of the soft sheet can be decreased. Moreover, because the surface of the sheet is a cover film made of a soft material, an advantage superior in practical use is obtained because no permanent set or damage occurs and the feeling and writing condition are not impaired.

What is claimed is:

1. In a signal input sheet of a horizontal sheet-like input device, wherein a conductive layer and a resistance layer are vertically arranged in an isolated state, an upper layer of one of said conductive layer and said resistance layer formed on a flexible sheet made of a soft material to provide a flexible signal input sheet, a lower layer of the other of said conductive layer and said resistance layer formed on a base, said signal input sheet being formed by aligning said flexible signal input sheet with said base so that said conductive layer and resistance layer are aligned, said conductive layer contacts a writing pressure point of said resistance layer according to a writing pressure given from the surface of said signal input sheet, said flexible signal input sheet having a first degree of hardness, and a variable electric circuit is formed between said conductive layer and said resistance layer, upon application of writing pressure on seal sheet-like input device, to obtain a position signal; said sheet-like input device characterized in that at least a cover film having a second degree of hardness greater than said first degree of hardness, film layer having a third degree of hardness greater than said second degree of hardness, an adhesive layer, and a shield layer are laminated in order from the top on said signal input sheet.

2. The input device according to claim 1, wherein said conductive layer comprises an electrical contact surface and an electrical point contact surface.

3. The input device according to claim 2, wherein said conductive layer and said resistance layer are aligned for contact upon application of writing pressure at said electrical contact surface, and aligned for non-contact upon application of said writing pressure at said electrical point contact surface.

* * * * *

UNITED STATES PATENT AND TRADEMARK OFFICE
CERTIFICATE OF CORRECTION

PATENT NO. : 5,411,790
DATED : May 2, 1995
INVENTOR(S) : Kiichiro Ogawa, et al.

It is certified that error appears in the above-indentified patent and that said Letters Patent is hereby corrected as shown below:

Column 1, line 13, "gazelle" should read --gazette--.

Column 1, line 28, "Surface" should read --surface--.

Column 2, line 29, "Of" should read --of--.

Column 4, line 13, "Judge" should read --judge--.

Column 4, line 44, "tile sheet" should read --the sheet--.

Column 7, line 18, "Same" should read --same--.

Column 8, line 36, "hardness, film layer" should read --hardness, an adhesive layer, a hard film layer--.

Signed and Sealed this

Sixth Day of August, 1996

Attest:

BRUCE LEHMAN

*Attesting Officer*          *Commissioner of Patents and Trademarks*